(12) United States Patent
Roberts

(10) Patent No.: US 12,019,411 B2
(45) Date of Patent: Jun. 25, 2024

(54) PROCESS CONTROLLER HAVING ADJUSTABLE PARAMETERS

(71) Applicant: Eurotherm Limited, Shropshire (GB)

(72) Inventor: Samuel Roberts, Littlehampton (GB)

(73) Assignee: Eurotherm Limited, Telford (GB)

( * ) Notice: Subject to any disclaimer, the term of this patent is extended or adjusted under 35 U.S.C. 154(b) by 16 days.

(21) Appl. No.: 17/111,744

(22) Filed: Dec. 4, 2020

(65) Prior Publication Data

US 2021/0088983 A1   Mar. 25, 2021

Related U.S. Application Data

(62) Division of application No. 15/814,527, filed on Nov. 16, 2017, now abandoned.

(60) Provisional application No. 62/423,926, filed on Nov. 18, 2016.

(51) Int. Cl.
*G05B 13/02* (2006.01)
*F27D 19/00* (2006.01)
*G05B 15/02* (2006.01)
*G05B 19/042* (2006.01)

(52) U.S. Cl.
CPC ........... *G05B 13/021* (2013.01); *F27D 19/00* (2013.01); *G05B 15/02* (2013.01); *G05B 19/0428* (2013.01); *F27D 2019/0012* (2013.01); *F27D 2019/0018* (2013.01); *F27D 2019/0028* (2013.01)

(58) Field of Classification Search
CPC .. G05B 13/021; G05B 19/0428; G05B 15/02; F27D 19/00; F27D 2019/0012; F27D 2019/0028; F27D 2019/0018; G01N 25/66; Y10S 148/022; C23C 18/1682
See application file for complete search history.

(56) References Cited

U.S. PATENT DOCUMENTS

| 4,288,062 | A | * | 9/1981 | Gupta | G05D 21/02 |
| | | | | | 266/88 |
| 5,496,450 | A | * | 3/1996 | Blumenthal | F23N 5/022 |
| | | | | | 324/555 |
| 6,591,215 | B1 | | 7/2003 | Blumenthal et al. | |
| 2007/0208677 | A1 | | 9/2007 | Goldberg et al. | |
| 2008/0149227 | A1 | * | 6/2008 | Connery | C23C 8/20 |
| | | | | | 148/223 |

(Continued)

FOREIGN PATENT DOCUMENTS

| JP | 2016121692 | | * | 12/2014 | ............ G01N 27/26 |
| JP | 2016121962 | A | * | 7/2016 | ............ G01N 27/26 |
| RU | 2007473 | | * | 2/1994 | ............... C21D 1/76 |

OTHER PUBLICATIONS

Super Systems, "Carbon Sensor Troubleshooting", 2009, pp. 4, downloaded from the internet https://www.supersystems.com/wp-content/uploads/T4413-1-R1-May 2009.pdf (Year: 2009).*

(Continued)

*Primary Examiner* — Robert E Fennema
*Assistant Examiner* — Olvin Lopez Alvarez
(74) *Attorney, Agent, or Firm* — Burris Law, PLLC

(57) ABSTRACT

Automatically generating a compensation factor for adjusting an operating parameter such that a measured carbon potential, dew point, or other controlled parameter matches the controller's set point value by inputting the measured parameter directly to the controller.

12 Claims, 8 Drawing Sheets

O₂ Sensor and Temperature

(56) References Cited

U.S. PATENT DOCUMENTS

| | | | |
|---|---|---|---|
| 2010/0082118 A1* | 4/2010 | McGreevy | G05B 19/4183 |
| | | | 704/275 |
| 2014/0236336 A1* | 8/2014 | Irick | B05D 3/0254 |
| | | | 700/109 |
| 2014/0303951 A1 | 10/2014 | Houeto et al. | |
| 2015/0079527 A1 | 3/2015 | Takahashi et al. | |
| 2016/0041536 A1 | 2/2016 | Benosman et al. | |
| 2017/0058785 A1 | 3/2017 | Laskowski | |
| 2017/0178256 A1 | 6/2017 | Albert et al. | |

OTHER PUBLICATIONS

Advanced Material and Processes, "Tool for Atmospheric Carbon Potential Analysis", 2014, pp. 1, from https://supersystems.com/wp-content/uploads/HTPro-CAT-100.pdf (Year: 2014).*

Super Systems, "Shim Stock Analysis", 2014, pp. 4 downloaded from http://www.supersystems.com/wp-content/uploads/T4408-1-R1-May 2009.pdf (Year: 2014).*

Super Systems, "Today's control technology enables adjustments in the furnace atmosphere correlated to the percent carbon calculation", 2015 pp. 2, downloaded from http://www.supersystems.com/wp-content/uploads/QualityCounts_Fall15.pdf (Year: 2015).*

Palermo, "Carbon potential control in MIM sintering furnace atmospheres", 2014, pp. 16, downloaded from https://www.sciencedirect.com/science/article/pii/S0026065714701304 (Year: 2014).*

Rowan et al, "Evaluation of Carbon Control in Carburized Parts", 2013, pp. 522-527, https://watermark.silverchair.com/a0005798.pdf?token=AQECAHi208BE49Ooan9kkhW (Year: 2013).*

Muhlenkamp, "Carbon potential verification", 2018, pp. 9, downloaded from https://thermalprocessing.com/metal-urgency-carbon-potential-verification/#:~:text=The%20temperature%20and%20oxygen%20voltage,of%20the%20steel%20%5B1%5D. (Year: 2018).*

AtoZmath.com, "Bisection Methodcalculator", 2009, pp. 2, downloadedfromtheinternethttps://atozmath.com/CONM/Bisection.aspx (Year: 2009).*

Michigan State Univeristy, "Math 20F linear Algebra", pp. 6, 2008 https://users.math.msu.edu/users/gnagy/teaching/05-fall/math20f/w2-f.pdf (Year: 2008).*

Invensys Eurotherm, "2700 User Manual", pp. 3, 2013, downloaded from https://www.manualslib.com/manual/1210806/Eurotherm-2704.html?page=2#manual (Year: 2013).*

Extended European Search Report for 17201254.4, dated Apr. 30, 2018 (7 pages).

Anonymous: "Control of Carbon Potential in Carbonizing Furnaces", (Dec. 31, 2015); pp. 1-4 XP055468032.

Anonymous: "UDC3200, Universal Digital Controller, Operator Manuel" (Apr. 30, 2008), pp. 1-90, The whole document.

Honeywell, "UDC3200 Universal Digital Controller Product Manual", 2012, pp. 244. Downloaded from the internet https://www.honeywellprocess.com/library/support/Public/Documents/51-52-25-119.pdf (Year: 2012).

Eurotherm, "Carburising Furnace Control System", 2019 pp. 3. downloaded from the internet https://www.eurotherm.com/carburising-furnace-control-system (Year: 2019).

Eurotherm, "EPC3000 Carbon Potential Control Supplement", Dec. 6, 2017 pp. 22, downloaded from the internet https://www.eurotherm.com/?wpdmdl=28121 (Year: 2017).

MathWorks, "Simulink user's guide R2011 b", Sep. 2011, pp. 67. (Year: 2011).

Rajovic et al, "Transformation of linear non-homogeneous differential equations of the second order to homogeneous", 2009, pp. 604-611. (Year: 2009).

"Eurotherm ACP Probe," HA031514USA, Issue 2, Jun. 2013, 17 pages, Invensys Systems, Inc., Ashburn, VA, USA.

"Zirconia Sensor Theory," T4401-1-R1, May 2009, 7 pages, Super Systems Inc., Cincinatti, Ohio, USA.

* cited by examiner

PROCESS CONTROLLER HAVING ADJUSTABLE PARAMETERS

CROSS-REFERENCE TO RELATED APPLICATION

This application is a divisional of U.S. application Ser. No. 15/814,527, filed Nov. 16, 2017, which claims priority to U.S. Provisional Application No. 62/423,926, filed Nov. 18, 2016. The entire contents of the above-identified applications are expressly incorporated herein by reference, including the contents and teachings of any references contained therein.

TECHNICAL FIELD

Aspects of the present disclosure generally relate to the field of heat treatment of steel. More particularly, aspects of the present disclosure relate to the use of process controllers and zirconia oxygen probes in connection with atmosphere furnaces, endothermic gas generators, and the like for case-hardening and similar heat treatment operations.

BACKGROUND

In an atmosphere furnace, which is filled with a gaseous atmosphere of a precisely controlled composition, "carbon potential" is regulated by adjusting enrichment or dilution gas. In an endothermic gas generator, which generates the protective atmosphere for the atmosphere furnace, "dew point" is regulated. A typical process controller is able to calculate the carbon potential and/or the dew point of a given atmosphere composition by measuring both its temperature and the amount of oxygen in equilibrium with the gases present. To make these measurements, an in-situ zirconia oxygen probe is used, usually containing both a $ZrO_2$ cell and a thermocouple. Based on the calculation, the controller executes a carbon potential control loop, for example, to open a solenoid valve to allow either a carburizing (or carburizing) or enriching gas (e.g., propane) or a diluting gas (e.g., air or nitrogen) to enter the furnace.

Carbon potential represents a property of a given atmosphere composition. It is often used as the control variable for a gas carburizing furnace. Carbon potential provides a measure of the ability of a given atmosphere composition to diffuse carbon into a heated steel workload. It is defined as the value of carbon concentration achieved in a shim exposed to the atmosphere, once it has obtained equilibrium. In other words, if the surface of a workload has a carbon content of 0.5% (by weight), and the atmosphere neither adds nor removes carbon, then the carbon potential of the atmosphere is said to be 0.5% C.

Oxygen probes have conventionally been used to measure the carbon potential of heat treating atmospheres. The oxygen probe is the only in-situ measurement technique available; this gives it a reliability advantage over other techniques that require gas samples to be transported from the furnace via complex sampling systems. It also offers a rapid response time that is ideal for real-time control of an atmosphere, as well as being cost-effective.

By using an oxygen probe, a correction known as a CO factor can be used to adjust the calculation of carbon potential. Conventional techniques require manually adjusting the CO factor, which typically involves three steps. The first step is seeking historical data of the furnace for the time that the shim was made. Given that it can take a week or more to get results back from the metallurgical lab, this historical data may not be readily available and may be difficult to locate. The second step is using the historical data to put the furnace back into the operating condition it was in at the time the shim was made and allowing the conditions to settle. The third step is adjusting the CO factor using a combination of intuition and trial-and-error to make the process value (PV) match the actual carbon potential.

SUMMARY

Aspects of the disclosure provide new systems and methods of adjusting the carbon potential readouts on a process controller in heat treatment applications. This eliminates the need for the user to deal with obscure and indirect methods of adjustment, instead entering values into the controller that has real and apparent physical meaning. This greatly reduces chance of user error, which may make a process worse rather than better.

In an aspect, a system includes a heat treatment furnace and a controller coupled to the furnace for controlling one or more operating parameters of the furnace. In addition, the system includes a user human machine interface coupled to the controller. The controller has a memory storing computer-executable instructions that, when executed, generate a compensation factor by which the controller adjusts at least one of the one or more operating parameters. The computer-executable instructions comprise transforming a numerical equation for calculating the compensation factor into a homogeneous form, initializing the transformed equation based on a set of initial values, and iteratively solving the transformed equation to determine a value of the compensation factor that minimizes a difference between a set point value of at least one of the operating parameters and a measured value of the at least one of the operating parameters.

A method embodying aspects of the invention calibrates a gas carburizing furnace. The method includes heating a shim in the furnace, measuring a carbon potential of the shim, and providing the measured carbon potential to a controller. The controller, which is coupled to the furnace, controls one or more operating parameters of the furnace as a function of a carbon potential set point. The method further includes generating a compensation factor as a function of the measured carbon potential and adjusting at least one of the one or more operating parameters based on the compensation factor such that the measured carbon potential and the carbon potential set point are equal.

Another method embodying aspects of the invention calibrates an endothermic gas generator. The method includes measuring a dew point of gas within the generator and providing the measured dew point to a controller. The controller, which is coupled to the generator, controls one or more operating parameters of the generator as a function of a dew point set point. The method further includes generating a compensation factor as a function of the measured dew point and adjusting at least one of the one or more operating parameters based on the compensation factor such that the measured dew point and the dew point set point are equal.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
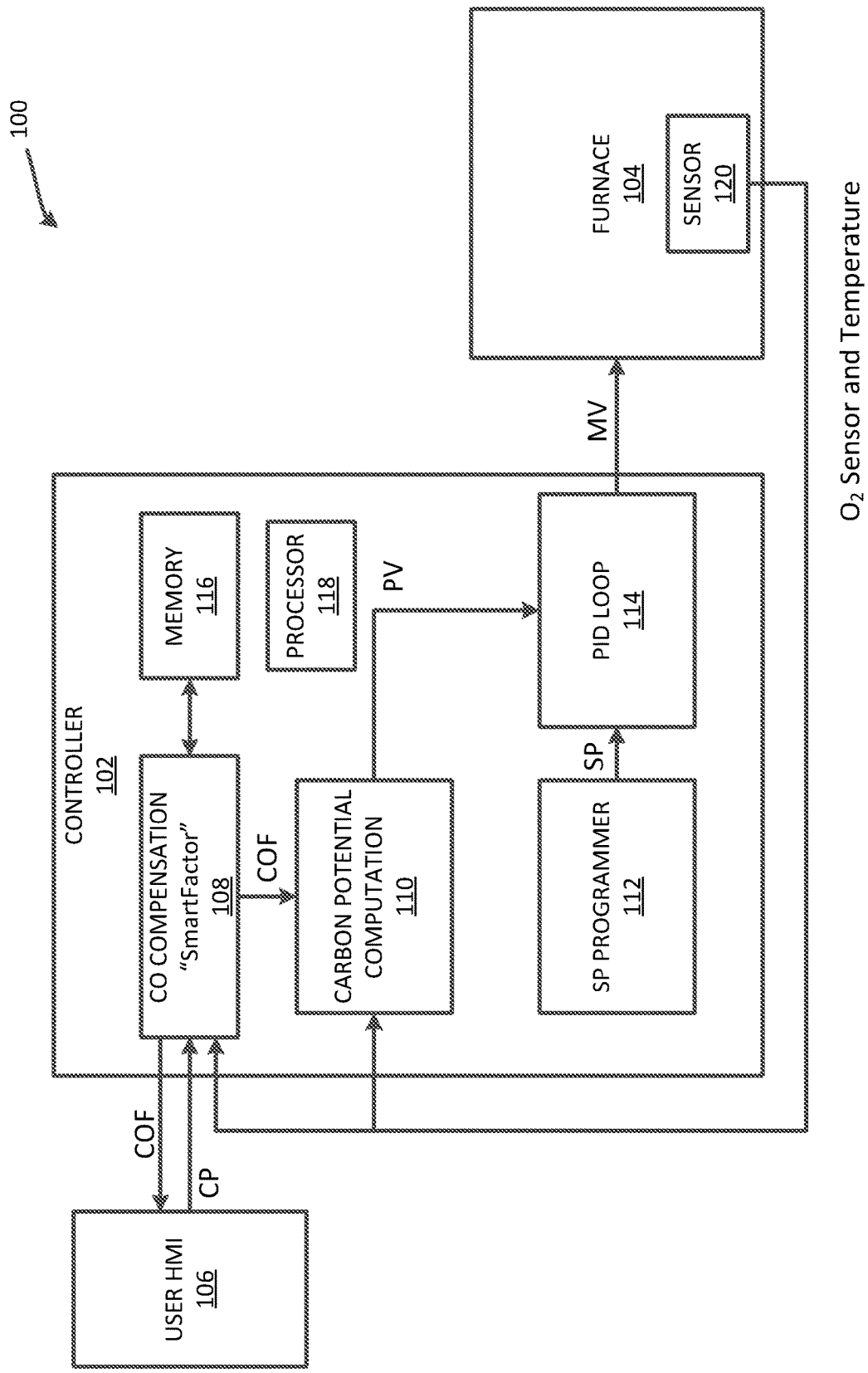
FIG. 1 illustrates an exemplary heat treatment control system according to an embodiment of the invention.

FIG. 1 illustrates an exemplary heat treatment control system 100 according to an embodiment of the invention. The system 100 includes a process controller 102, a gas atmosphere furnace 104, and a user human-machine interface (HMI) 106. The controller 102 includes a compensation function 108, a carbon potential computation component 110, a setpoint (SP) programmer 112, a proportional-integral-derivative (PID) loop 114, and a memory 116. In an aspect of the disclosure, the compensation function 108, the carbon potential computation component 110, the SP programmer 112, and the PID loop 114 are embodied in processor-executable instructions stored on the memory 116 and executed by a processor 118 of controller 102. The furnace 104 includes a sensor 120 configured to sense physical properties (e.g., oxygen, temperature, etc.) within furnace 104. In the embodiment illustrated in FIG. 1, compensation function 108 comprises a CO compensation function, which may be referred to as a "SmartFactor" in one or more embodiments.

The process controller 102 is configured for controlling operation of, for example, the gas atmosphere furnace 104 for use in carburizing, carbonitriding, nitrocarburizing, neutral carbon potential annealing operations, and the like. For purposes of quality assurance, it is necessary to periodically verify that the readouts of the controller 102 for the determined carbon potential, dew point, or another control variable are accurate. If they are not, an adjustment must be applied to the calculations. The carbon potential of an atmosphere inside the furnace 104, such as shown in FIG. 1, is often verified using shim stock analysis or other similar techniques. Best practice dictates that this should be performed on a regular basis, perhaps once a week. In practice, frequency varies from shop to shop. Shim stock analysis involves placing a piece of shim stock, metal coupon, metal foil, or the like inside the furnace 104 and allowing carbon to diffuse. Because the shim is so thin, a uniform carbon profile is obtained in a relatively short period of time. By weighing the shim with a precision balance before and after, or by sending the shim to a metallurgical laboratory for analysis, the carbon content by weight can be determined. This value is, by definition, equal to the real, or actual, carbon potential in the furnace 104. Alternatives to shim stock analysis includes the use of "coils" whose electrical resistance can be measured to determine the real carbon potential, or multi-gas infrared analysis.

Where an oxygen probe (e.g., sensor 120) is used, a correction (e.g., compensation function 108) can then be applied to the calculations in order to make the carbon potential readout of the controller 102 match that obtained by shim stock analysis. This correction factor is often known as the "CO factor." The CO factor is used to adjust the calculation of carbon potential. Nominally it represents the concentration of CO in the furnace atmosphere but in reality it is used as a general rolled-up compensation factor. Often depending on the manufacturer of the oxygen probe, the compensation factor is referred to as, for example, process factor, zone factor, gas factor, furnace factor, and calibration factor.

In an embodiment, the user enters a carbon potential (CP) via the user HMI 106. The HMI 106, which is coupled to controller 102, then transmits the CP to compensation function 108. A compensation factor (COF) generated by compensation function 108 as further described herein is transmitted to user HMI 106 for displaying to the user and also provided to carbon potential computation component 110. The carbon potential computation component 110 generates a process value (PV) and transmits it to PID loop 114. The SP programmer 112 generates a setpoint (SP) and transmits it to PID loop 114. Based on the PV and SP, PID loop 114 generates adjustments to operating parameters (e.g., temperature, time, etc.) of furnace 104.

Figure 2:
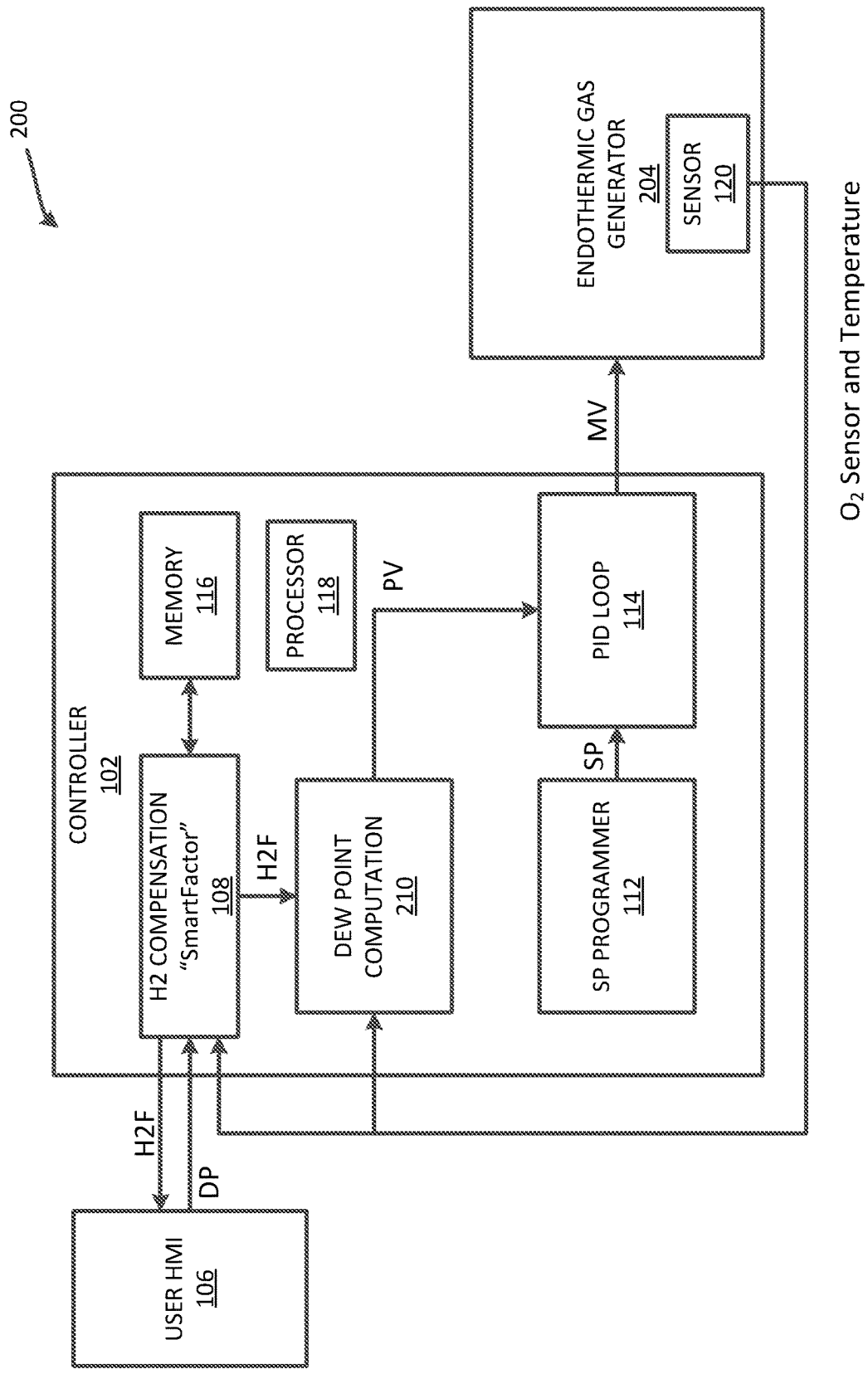
FIG. 2 illustrates an exemplary endothermic gas generator control system according to an embodiment of the invention.

FIG. 2 illustrates an exemplary endothermic gas generator control system 200 according to an embodiment of the invention. The system 200 includes process controller 102, user HMI 106, and an endothermic gas generator 204. The controller 102 includes the compensation function 108, a dew point computation component 210, the SP programmer 112, the PID loop 114, and the memory 116. In an aspect of the disclosure, the compensation function 108, the dew point computation component 210, the SP programmer 112, and the PID loop 114 are embodied in processor-executable instructions stored on the memory 116 and executed by the processor 118 of controller 102. The generator 204 includes the sensor 120 configured to sense physical properties (e.g., oxygen, temperature, etc.) within generator 204. In the embodiment illustrated in FIG. 2, compensation function 108 comprises an H2 compensation function, which may be referred to as a "SmartFactor" in one or more embodiments.

The process controller 102 is configured for controlling operation of, for example, the endothermic gas generator 204. A similar compensation process is often performed for the gas generator 204 in which dew point represents another property of a given atmosphere composition typically used as the control variable. Dew point can be measured using, for example, an Alnor dew pointer. A compensation factor (e.g., compensation function 108) referred to as the "H2 factor" can be adjusted until the dew point readout of the controller matches the measured value. The H2 factor is used to adjust the calculation dew point. Nominally it represents the concentration of H2 in the measured atmosphere but in reality it is used as a general rolled-up compensation factor.

In an embodiment, the user enters a dew point (DP) via the user HMI 106. The HMI 106, which is coupled to controller 102, transmits the DP to compensation function 108. A compensation factor (H2F) generated by compensation function 108 as further described herein is transmitted to user HMI 106 for displaying to the user and also provided to dew point computation component 210. The dew point computation component 210 generates a process value (PV) and transmits it to PID loop 114. The SP programmer 112 generates a setpoint (SP) and transmits it to PID loop 114.

Based on the PV and SP, PID loop 114 generates adjustments to operating parameters (e.g., temperature, time, etc.) of endothermic gas generator 204.

The Eurotherm E+PLC product, which is currently in the market place, uses a numerical solver to calculate the adjustment factors based on three gas concentration readings (% $CO_3$, % $CO_2$ and % $CH_4$) from an on-line infrared analyzer.

Aspects of the invention relate to the manner in which the user interacts with the process controller 102 to perform the task of adjusting the oxygen probe (e.g., sensor 120) calculations. In an embodiment, the user enters the actual carbon potential (or dew point) (e.g., determined via shim stock analysis) directly via the user human machine interface (HMI) 106 and the controller 102 adjusts itself automatically rather than requiring conventional trial-and-error compensation. The user interaction in performing this task is entirely abstracted from the industry-standard compensation factors (e.g., process factor, CO factor, H2 factor, etc.). In an embodiment, controller 102 executes the compensation function 108 (e.g., CO factor loop, H2 factor loop) to perform numerical techniques to solve the oxygen probe equations and automatically determine the industry-standard compensation factors (e.g., process factor, CO factor, H2 factor, etc.) based on the user interaction.

Instead of altering the process factor, CO factor, H2 factor, or the like, which are the usual but obscure and indirect means of adjusting the readouts, the user enters the actual carbon potential or actual dew point into the controller 102 directly via HMI 106. Thus, aspects of the present disclosure provide a more intuitive experience than conventional techniques. The intuitive experience provided by systems and methods of the present disclosure is less likely to lead to mistakes. For example, if by shim stock analysis the user determines the real atmosphere carbon potential to be 0.87% C, the user enters that number into the process controller 102. The controller 102 then calculates the required value of process factor or CO factor automatically based on process information, including but not limited to the oxygen and temperature measurements.

The memory 116 stores the required process information at the time the shim is made. The user needs simply to instruct the process controller 102 that they are making a shim. When the results come back from the lab, perhaps a week later, they enter the result directly and the process controller 102 utilizes the historical data (e.g., selecting the historical data by timestamp, unique serial number, etc.). The first and second steps in the conventional manual process described above are eliminated. The systems and methods in accordance with the disclosure herein make the whole process shorter and easier.

Similarly, if a user determines that the actual dew point at the output of the endothermic gas generator 204 is 40° F., the user enters that number into the process controller 102 via user HMI 106. In this manner, the dew point is directly entered by the user and the user need not transform the dew point into terms of the PV. The controller 102 then calculates (e.g., by executing compensation factor 108) the value of process factor or H2 factor automatically based on current process information.

Aspects of the present invention provide process supervisors with an interface that is much easier to understand and use. Further, aspects of the invention simplify processes and procedures for process managers.

The compensation function 108 executed by controller 102 allows a user to enter an actual carbon potential or an actual dew point and it then calculates the appropriate CO, H2, or process factor based on stored process information.

Figure 3:
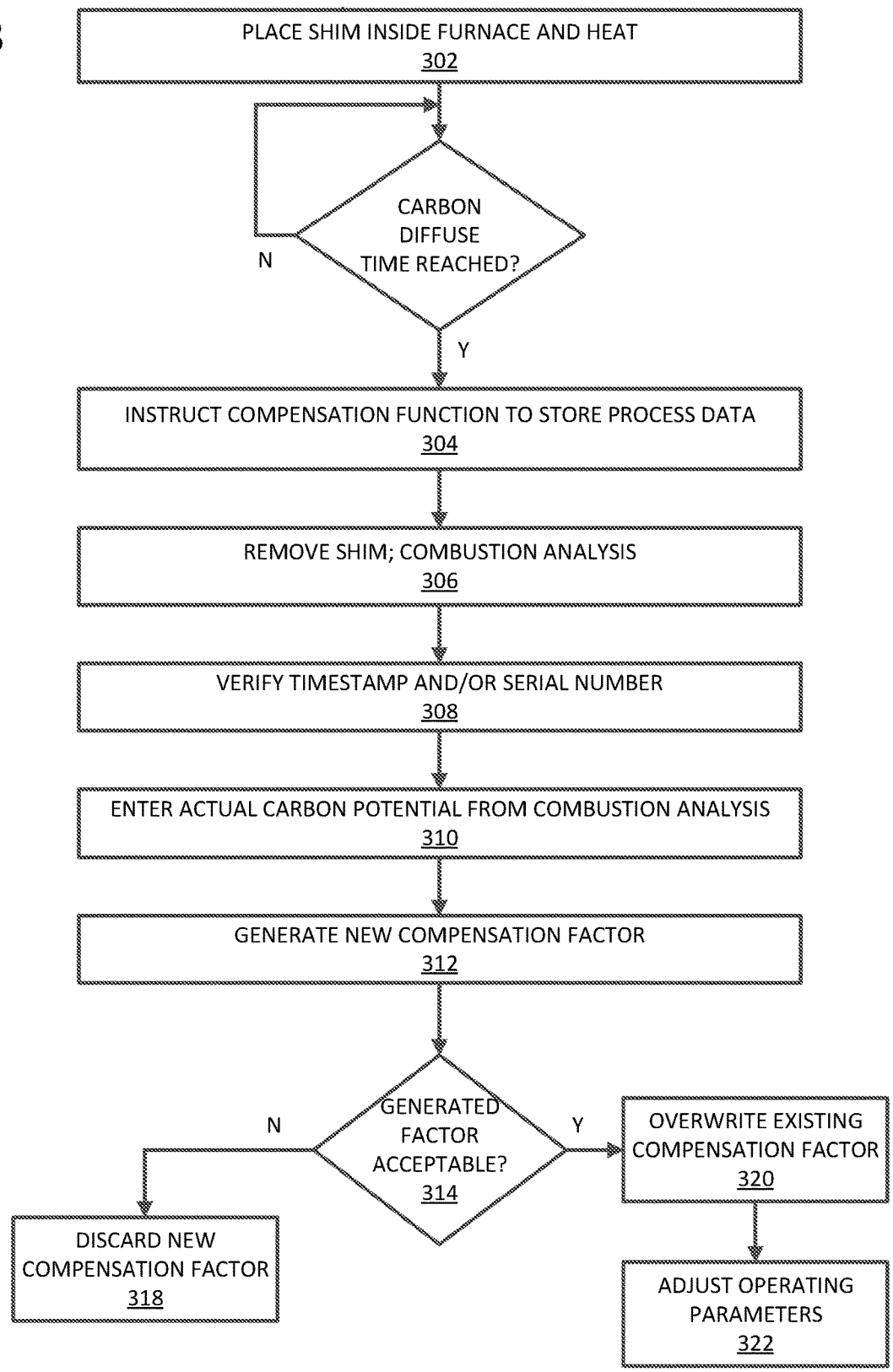
FIG. 3 illustrates an exemplary workflow according to an embodiment of the invention.

FIG. 3 illustrates an exemplary user workflow embodying aspects of the invention. At 302, the user puts shim coupon inside furnace 104, heats the shim, and waits a sufficient time for carbon to diffuse. When the carbon diffuse time is reached, just before removing the shim from the furnace 104, the user presses a button on HMI 106 to instruct compensation function 108 to generate a serial number unique to the shim and collect and save (e.g., store in memory 116) relevant process data at 304. At 306, the user removes the shim from furnace 104 and initiates a combustion analysis of the shim. For example, the user may send the shim coupon to a metallurgy lab for combustion analysis and wait for the results. In an embodiment, a length of time (e.g., about one week, etc.) passes between initiating the combustion analysis and receiving the results.

When the results of the combustion analysis are received, the user returns to the HMI 106 screen. At 308, the user verifies the timestamp and/or serial number to ensure that the stored process data in memory 116 corresponds to the received combustion analysis result. At 310, the user enters the result (e.g., the actual carbon potential, % C) directly into an ActualCP field of HMI 106. In response, the compensation function 108 calculates a new COF/PF at 312. The calculated value is displayed to the user via the HMI 106. The user decides at 314 whether to accept or reject the calculated compensation factor. When the user rejects the calculated compensation factor, the user indicates the rejection via a selection on user HMI 106 and the newly calculated compensation factor is discarded (e.g., removed from memory 116, etc.). The user may then enter a different compensation value via user HMI 106. When the user accepts the calculated compensation factor, the new factor overwrites a previous compensation factor (e.g., the new factor is copied to the local COF/PF value) at 320 and the Zirconia calculations immediately begin using it. At 322, the controller 102 adjusts operating parameters of furnace 104. Although described with reference to heat treatment control system 100, one of ordinary skill in the art will understand that the user workflow described above may be performed by endothermic gas generator control system 200 to adjust operating parameters of endothermic gas generator 204.

In an embodiment, (e.g., for other verification methods like multi-gas or coil resistance) there may not be any significant delay between taking the measurement and obtaining the result. In these cases, the user can go right ahead and enter the result via user HMI 106 immediately after collecting the process data.

Figure 4:
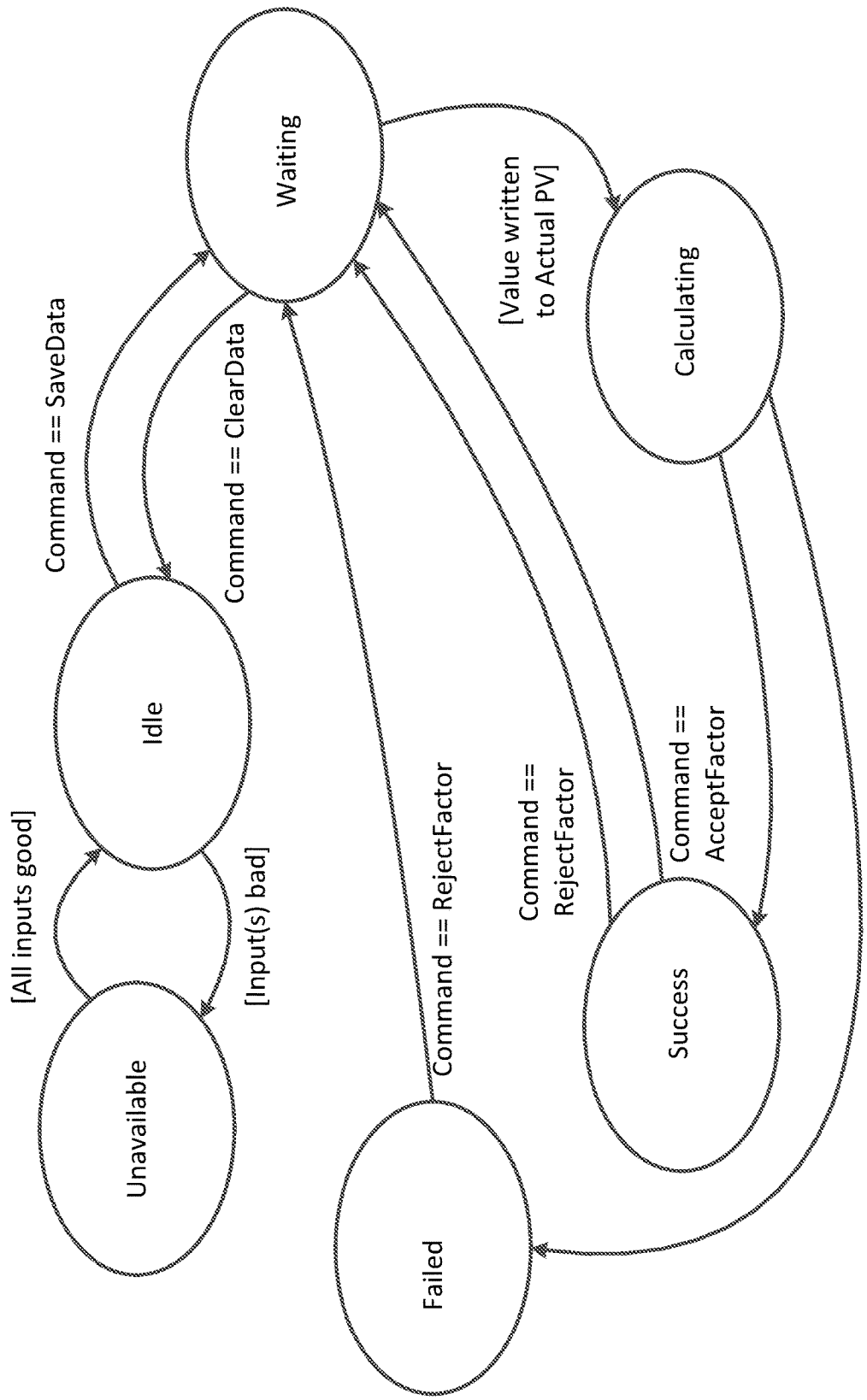
FIG. 4 illustrates an exemplary state machine for driving the workflow of FIG. 3 according to an embodiment of the invention.

In an embodiment, the workflow is driven by a state machine, as shown in FIG. 4. The signals/events shown in this state drawing are based on the elk parameterization shown below. One of ordinary skill in the art will understand that other parameterizations are within the scope of the present disclosure. Once the user has entered the real carbon potential or dew point (e.g., step 310), the controller 102 automatically calculates the required process, CO, or H2 factor that makes the readouts match reality.

Figure 5:
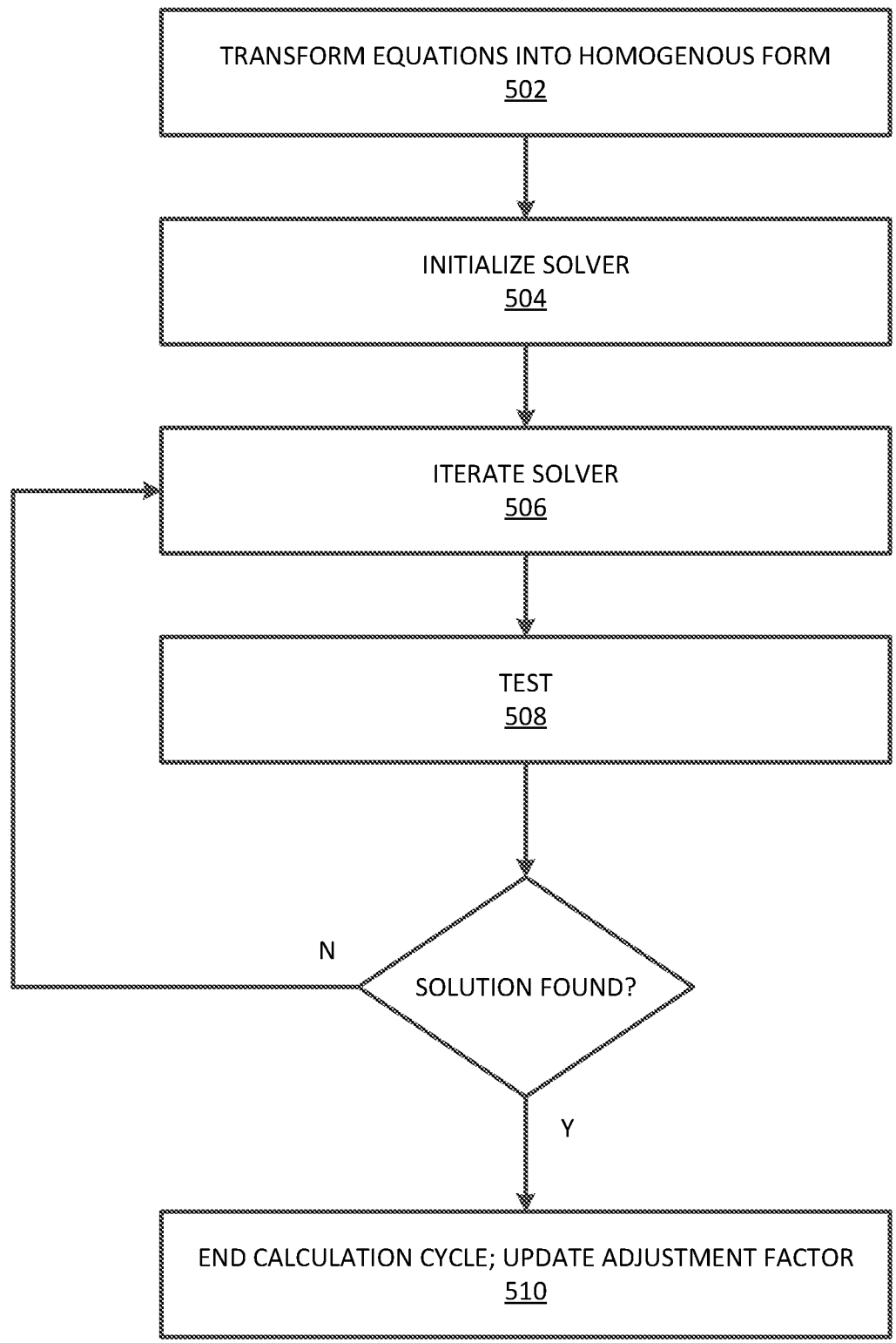
FIG. 5 illustrates an exemplary equation solving process according to an embodiment of the invention.

There are many different equations that are used by the process controller 102 to calculate carbon potential and dew point. The equations that are used are dependent upon the probe manufacturer and model, and so it is important that the correct equation is used for the correct probe. The equations generally have a high level of complexity and are very non-linear. Several of the equations have no explicit solutions in the elementary functions. Advantageously, a method embodying aspects of the invention is used to solve the equations numerically and thereby to determine the correct values of process factor, CO factor, or H2 factor. The method is illustrated in FIG. 5. At 502, the carbon potential or dew point equations are transformed into the homogenous form. The objective of this algorithm is then to find x, such that f(x)=0 (where x is CO factor, P factor, or H2 factor depending on the probe and whether it is performing a carbon potential or dew point adjustment). The algorithm makes some initial guesses (e.g., those described in Table 1) and runs an initialization routine to set up the solver at 504.

Figure 6:
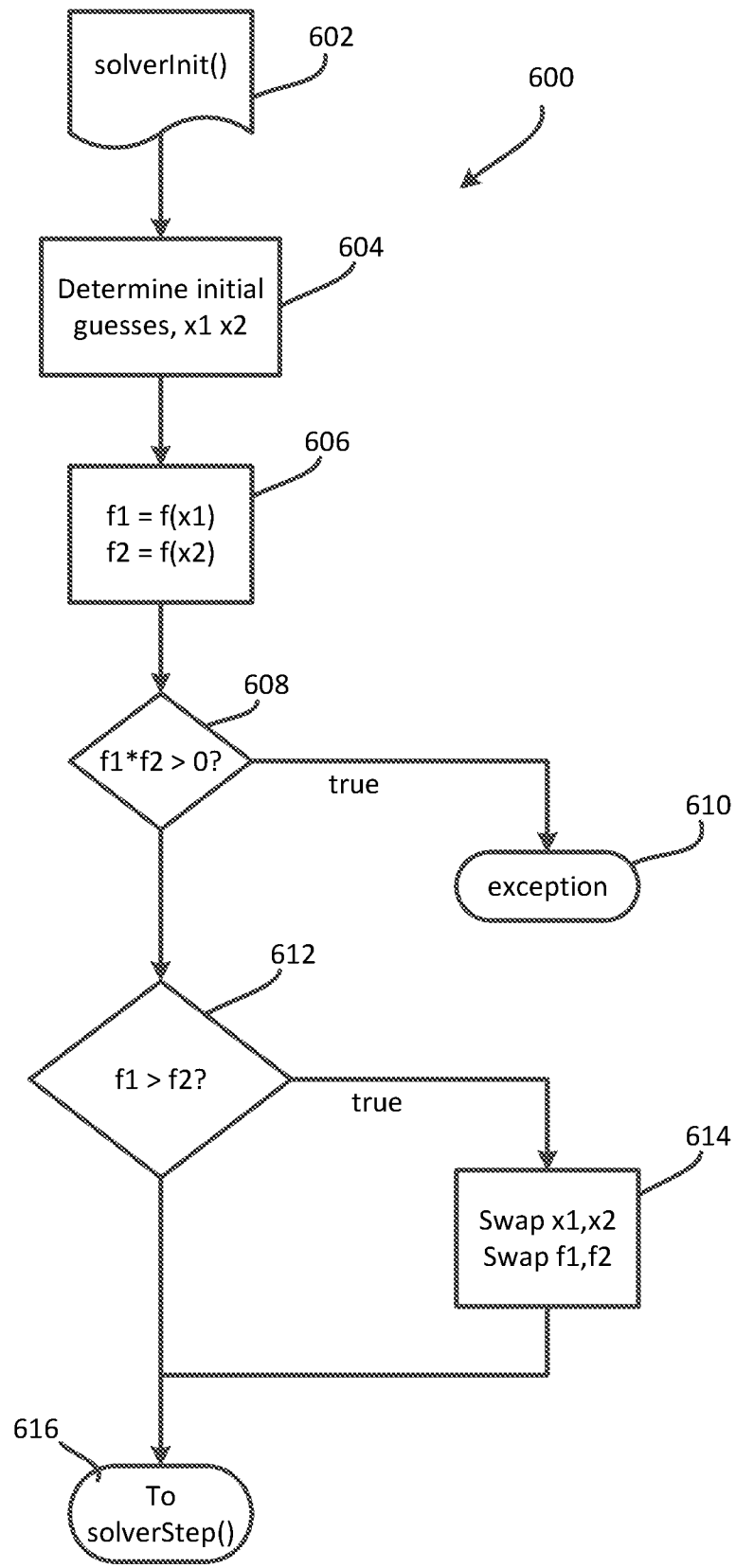
FIG. 6 is an exemplary flow diagram illustrating an initialization of a solver algorithm according to an embodiment of the invention.

FIG. 6 is an exemplary flow diagram 600 illustrating a solver algorithm initialization subroutine solverinit( ) which begins at 602, according to an embodiment of the invention. At 604, the subroutine determines initial values x1 and x2. Examples of initial values are shown in TABLE 1, below. The function f(x) has an initial value f1 when x is set to x1 and has an initial value f2 when x is set to x2 at 606. In other words, f1=f(x1) and f2=f(x2). At 608, the illustrated subroutine determines if the value f1 multiplied by f2 is greater than zero. One skilled in the art will recognize that if f(x) where x=x1 (i.e., f1) has the same sign as the value of f(x) where x=x2 (i.e., f2), then f1*f2>0. If f1 and f2 are both positive or both negative, the product of the two functions is greater than 0. The subroutine generates an exception at 610 if f1*f2>0. On the other hand, if the f1*f2>0, the subroutine proceeds to 612 for determining which of the two values is greater. If f1>f2, then the subroutine swaps the values x1 and x2 in the function f(x) at 614 and ends at 616. Otherwise, the subroutine proceeds from 612 to end at 616. The algorithm then runs, at 506, one or more 'step' iterations on every controller 102 timestep.

Figure 7:
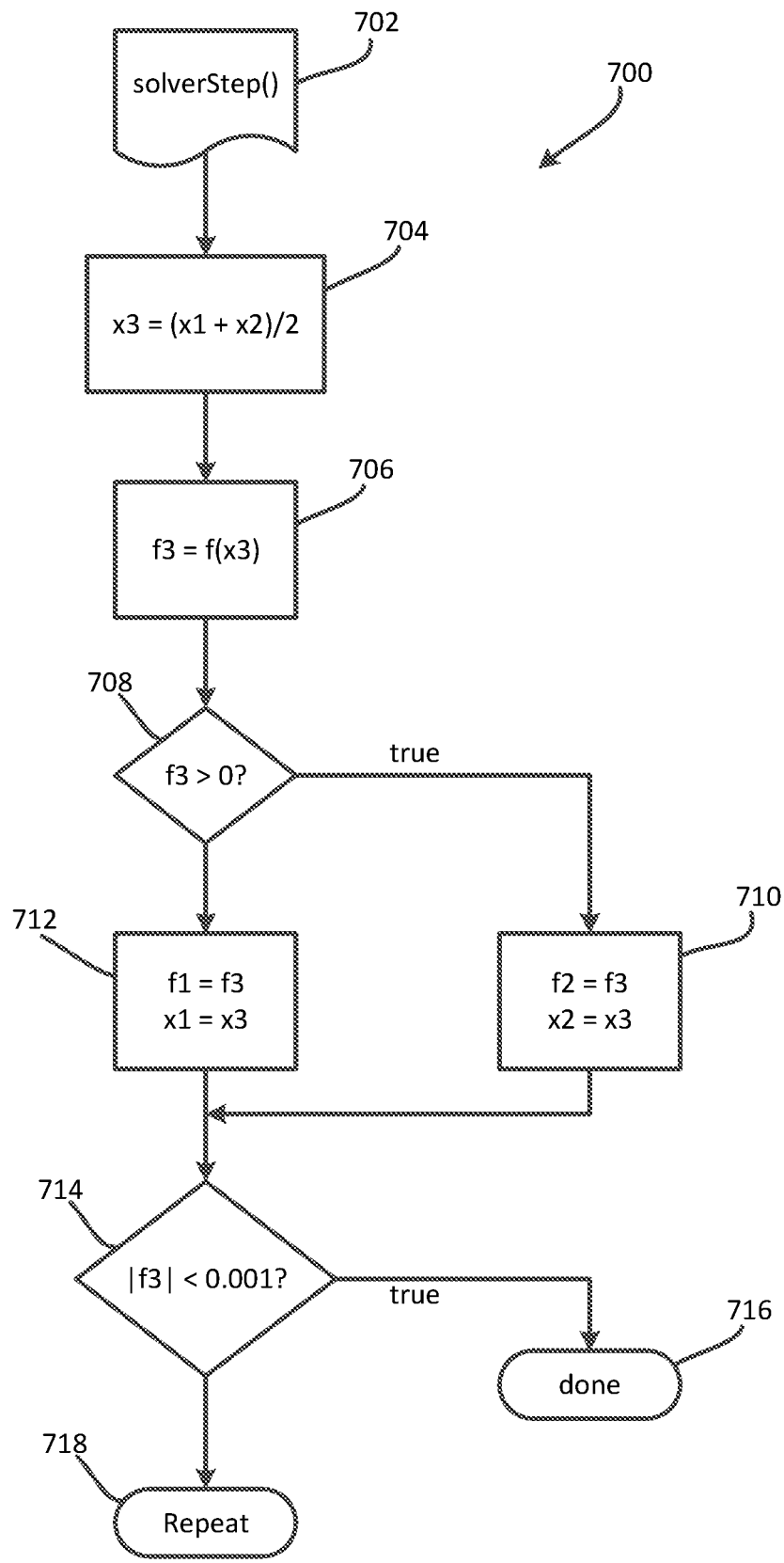
FIG. 7 is an exemplary flow diagram illustrating a solver algorithm iteration according to an embodiment of the invention.

In an embodiment, the step iterations comprise a numerical search by bisection, as illustrated in FIG. 7. FIG. 7 is an exemplary flow diagram 700 illustrating a solver algorithm iteration subroutine solverStep( ) which begins at 702, according to an embodiment of the invention. The first iteration occurs at 704 where x3=(x1+x2)/2, the average of the initial values x1 and x2. The function f(x) has its value set to x3 such that f3=f(x3) at 706. As shown in the flow diagram 700 of FIG. 7, the subroutine drives the function f3 to have a value of approximately zero beginning at 708. At 708, the subroutine determines if f3>0. If so, the subroutine updates the value of f2 with the value of f3 by swapping x3 for x2 at 710. On the other hand, if f3=0 then the subroutine updates the value of f1 with the value of f3 by swapping x3 for x1 at 712. The subroutine continues driving the function f3 to have a value of approximately zero and if |f3|<0.001 at 714, the subroutine considers this iteration done at 716. If |f3|≥0.001 at 714 then the subroutine repeats at 718 indicating that this iteration did not arrive at a solution.

As described above, there are many different equations that are used by the process controller 102 to calculate carbon potential and dew point. The equations that are used are dependent upon the probe manufacturer and model, and so it is important that the correct equation is used for the correct probe. The equations generally have a high level of complexity and are very non-linear. Several of the equations have no explicit solutions in the elementary functions. Advantageously, a method embodying aspects of the invention is used to solve the equations numerically and thereby to determine the correct values of process factor, CO factor, or H2 factor. The method illustrated in FIG. 5, begins by making some initial guesses (e.g., those described in Table 1) and runs an initialization routine to set up the solver. Iterations are scheduled in this way so that the complex mathematics can run suitably on low cost process controller products. One of ordinary skill in the art will understand that other techniques for the step iterations are within the scope of the present disclosure. After each iteration, a test is performed at 508 to determine whether the solution is found. The solution is defined to be that which gives a result to within +/−0.001% C or 0.1° F./C of the value that the user entered. When a solution is not found, the process repeats back to 506 to iterate the solver. When a solution is found, the calculation cycle is ended, and the appropriate adjustment factor is updated, thus adjusting the readout at 510.

TABLE 1

| Adjust Type | Probe Type | Adjust? | x1 | x2 |
| --- | --- | --- | --- | --- |
| Carbon Potential | MMI | PF | 300 | 60 |
| | NOT MMI | COF | 1 | 40 |
| Dew point | MMI | PF | 300 | 60 |
| | NOT MMI | H2F | 2 | 80 |

As described above, aspects of the compensation function 108 can be designed in Simulink to facilitate the e2k parameterization. In an embodiment, this is a new subclass within, for example, a standard 'Zirconia' function block executed by controller 102. This block is found in many products including EPC3000 (Dakar), 2704, 3500, nanodac, E+PLC and T2x50 (LIN). The Zirconia function block is used extensively in the heat treatment segment.

The compensation function 108, also referred to as SmartFactor, simplifies the periodic adjustment of the zirconia calculations by abstracting users from obscure compensation factors. It makes the adjustment procedure shorter, more intuitive and less prone to error. This in turn can increase quality. In an embodiment, SmartFactor is a product-agnostic enhancement for E+PLC, EPC3000, and nanodac and other controllers. The following table (Table 2) details an exemplary e2k parameterization according to an embodiment of the invention.

TABLE 2

| Parameter | Type | Description | | |
| --- | --- | --- | --- | --- |
| SmartFactorType | num | Selects which readout SmartFactor will be used to adjust. | | |
| | | Value | Description | |
| | | CarbonPotential (0) | SmartFactor adjusts the carbon potential readout. | |
| | | DewPoint (1) | SmartFactor adjusts the dew point readout. | |
| | | Availability: Config only. Alterability: Always. | | |
| State | num | State of the SmartFactor state machine. | | |
| | | Value | Description | |
| | | Unavailable (0) | Bad inputs, below operating temperature etc. | |

TABLE 2-continued

| | | |
|---|---|---|
| | Idle (1) | Idle. Waiting for StoreData trigger to be set. |
| | Waiting (2) | Process data has been collected and stored. Waiting for input of the Actual Carbon Potential or Actual Dew Point. |
| | Calculating (3) | New factor is being calculated. Hold on. |
| | Success (4) | New factor found. Confirm that you want to use it. |
| | Failed (5) | Failed to find new factors. |
| | Availability: Always. | |
| | Alterability: Never. | |
| Command | num | Used to save and clear process data, and to then accept or reject calculated factors. The command will automatically reset itself back to the default value after each command is processed. |

| | Value | Description |
|---|---|---|
| | Select (0) | Default value. |
| | SaveData (1) | Collect and save process data. |
| | ClearData (2) | Clear saved process data. |
| | AcceptFactor (3) | Confirm the use of calculated factors and reset the state machine. The calculated factor will be copied to the local factor and Zirconia will begin using it immediately |
| | RejectFactor (4) | Reset the state machine. Any calculated factors will be lost. |
| | Availability: Always. | |
| | Alterability: When State != (Unavailable | | Calculating) | |
| | Limits: Full limit functions to restrict appearance of enumerated members that are not permitted for a given state. | |
| Timestamp | time | UNIX/POSIX style timestamp corresponding to the time at which process data was stored. Will be 0 when no data has been saved. (In EPC3000, this will not be available as there is no RTC) |
| | Availability: Always. | |
| | Alterability: Never. | |
| TimeSince | int | Time in seconds since process data was saved. Will be 0 when no data has been saved. |
| | Availability: Always. | |
| | Alterability: Never. | |
| SerialNumber | int | Automatically incrementing serial number. Increments each time process data is saved. Can be edited in Level 3 to allow starting values to be set (to ensure unique numbers across all furnaces), reset numbers and so on. |
| | Availability: Always. | |
| | Alterability: In Level 3 only. | |
| ActualPV | 32 | Actual Carbon Potential or Dew Point depending on setting of SmartFactorType. Writing to this value will begin the calculation of a new COF/H2F/PF. |
| | Availability: Always. | |
| | Alterability: When State == Waiting. | |
| CalculatedFactor | 32 | Calculated COF/H2F/PF. |
| | Availability: Always. | |
| | Alterability: Never. | |

Figure 8:
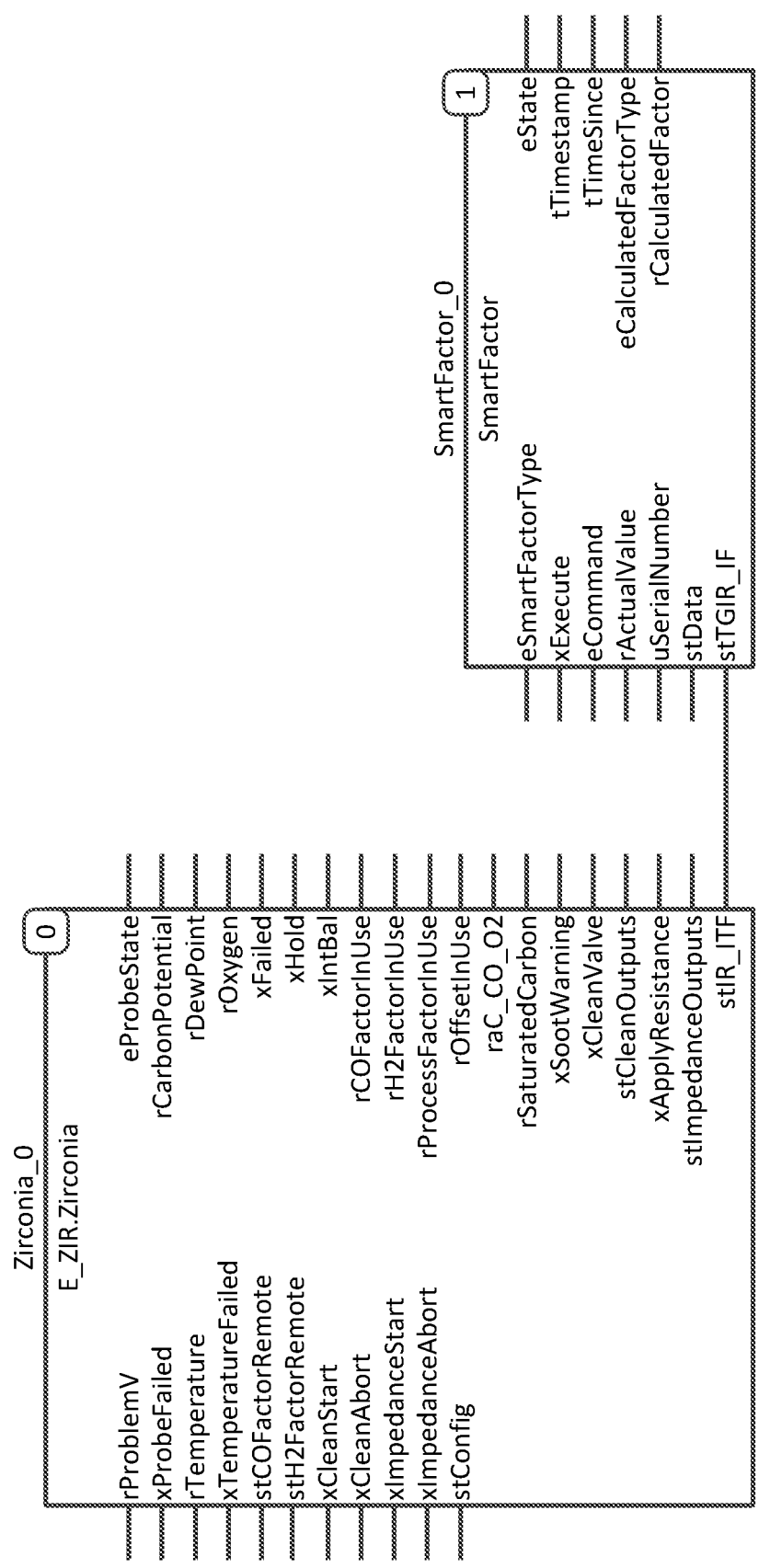
FIG. 8 is an exemplary CODESYS based interface according to an embodiment of the invention.

FIG. 8 is an exemplary CODESYS based interface according to an embodiment of the invention. In an embodiment, compensation function 108 is a generic function designed to facilitate the CODESYS based interface of FIG. 8. SmartFactor is shown as a separate function block that exchanges data with the Zirconia block via the existing bidirectional signal used for ThreeGasIR. The block I/O in CODESYS differs slightly from elk to account for differences in platform, for example there is no concept of availability or alterability in CODESYS. The following table (Table 3) details an exemplary block I/O according to an embodiment of the invention.

TABLE 3

| Pin | Type | Description |
|---|---|---|
| eSmartFactorType | IN: enum | Selects which readout SmartFactor will be used to adjust. |

| | Value | Description |
|---|---|---|
| | CarbonPotential (0) | SmartFactor adjusts the carbon potential readout. |
| | DewPoint (1) | SmartFactor adjusts the dew point readout. |

TABLE 3-continued

| | | |
|---|---|---|
| xExecute | IN: bool | Edge trigger (rising or falling) to execute the command selected on rCommand. |
| eCommand | IN: enum | |

| Value | Description |
|---|---|
| SaveData (0) | Collect and save process data. |
| ClearData (1) | Clear saved process data. |
| AcceptFactor (2) | Confirm the use of calculated factors and reset the state machine. The calculated factor will be copied to the local factor and Zirconia will begin using it immediately. |
| RejectFactor (3) | Reset the state machine. Any calculated factors will be lost. |

| | | |
|---|---|---|
| rActualValue | IN: real | Actual Carbon Potential or actual Dew Point depending on the setting of eSmartFactorType. |
| uSerialNumber | IN_OUT: uint | Automatically incrementing serial number. |
| stData | IN_OUT: struct | Internal states that need to be held in nonvolatile memory. |
| stTGIR_IF | IN_OUT: struct | Bidirectional link with the Zirconia block to allow exchange of PVs, statuses, states, factors, and so on. |
| stState | OUT: enum | State of the SmartFactor state machine. |

| Value | Description |
|---|---|
| Unavailable (0) | Bad inputs, below operating temperature etc. |
| Idle (1) | Idle. Waiting for StoreData trigger to be set. |
| Waiting (2) | Process data has been collected and stored. Waiting for input of the Actual Carbon Potential or Actual Dew Point. |
| Calculating (3) | New factor is being calculated. Hold on. |
| Success (4) | New factor found. Confirm that you want to use it. |
| Failed (5) | Failed to find new factors. |

| | | |
|---|---|---|
| tTimestamp | OUT: Time | POSIX timestamp corresponding to the time at which process data was stored. Will be 0 when no data has been saved. |
| tTimeSince | OUT: Time | Time since data was saved. |
| eCalculatedFactorType | OUT: enum | The type of factor that the block will be calculating. |

| Value | Description |
|---|---|
| COFactor (0) | CO Factor. |
| H2Factor(2) | H2 Factor. |
| ProcessFactor(3) | Process Factor. |

| | | |
|---|---|---|
| rCalculatedFactor | OUT: real | The calculated factor, either COF, H2F or PF. |

In another embodiment, SmartFactor is implemented as a Simulink subsystem within the Zirconia function block. Simulink is a tool used to develop the algorithms. It is to be understood that other such tools could be used. The Simulink implementation is deployable into the various products (e.g., 'e2k' or 'codesys' mentioned above).

The following table (Table 4) describes exemplary requirements for various embodiments.

TABLE 4

| Feature Description |
|---|
| Requirements of SmartFactor itself |
| User enters the actual carbon potential to trigger an adjustment. |
| User enters the actual dew point to trigger an adjustment. |
| Automatic adjustment of the carbon potential readout by calculation of a suitable CO Factor or Process Factor. |
| Automatic adjustment of the dew point readout by calculation of a suitable H2 Factor or Process Factor. |
| Support for all oxygen probes currently available in the Zirconia function block: |
| Eurotherm AP1 and ACP probes |
| MMI probes |
| AACC probes |
| Drayton probes |

TABLE 4-continued

| Feature Description |
| --- |
| Accucarb probes |
| SSI probes |
| MacDhui probes |
| Bosch wideband lambda type probes |
| Barber Coleman probes |
| AGA/Ferronova calculations |
| Ability to use live process information in determining suitable factors. (This covers coil resistance or multigas IR analysis methods). |
| Ability to store process information upon request and to recall that information later in order to determine suitable factors. (This covers shim stock analysis methods). |
| Robust protections against invalid user inputs. |
| Robust protections against internal numerical errors and non-convergences. |
| Limits on the extent to which the factors can be adjusted. |
| Requirements of a host product |
| HMI screens with proper feedback and confirmation. |

A system in accordance with an aspect of the invention includes a heat treatment furnace (e.g., gas atmosphere furnace 104), a controller (e.g., controller 102) coupled to the furnace, and a user human machine interface (e.g., user HMI 106) coupled to the controller. The controller is configured to control one or more operating parameters of the furnace. The controller includes a memory (e.g., memory 116) storing computer-executable instructions that, when executed by a processor (e.g., processor 118), generate a compensation factor. The controller further adjusts at least one of the operating parameters of the furnace based on the compensation factor. The computer-executable instructions include instructions for transforming (502) a numerical equation for calculating the compensation factor into a homogenous form and initializing (504) the transformed equation based on a set of initial values. The instructions further include instructions for iteratively solving (506) the transformed equation to determine a value of the compensation factor that minimizes a difference between a set point value of at least one of the operating parameters and a measured value of the at least one of the operating parameters of the furnace.

In one form, the compensation factor includes one or more of a CO factor, an H2 factor, a process factor, a zone factor, a gas factor, a furnace factor, and a calibration factor. In another form, the adjusted operating parameter is carbon potential. In yet another form, the adjusted operating parameter is dew point. In another form, the computer-executable instructions include instructions for overwriting (320) a previous value of the compensation factor with the determined value of the compensation factor upon receiving, via the user human machine interface, an indication (314) that the determined value of the compensation factor is acceptable. In yet another form, the computer-executable instructions include instructions for discarding (318) the determined value of the compensation factor upon receiving, via the user human machine interface, an indication (314) that the determined value of the compensation factor is unacceptable.

Another system in accordance with an aspect of the invention includes a gas generator (e.g., endothermic gas generator 204), a controller (e.g., controller 102) coupled to the generator, and a user human machine interface (e.g., user HMI 106) coupled to the controller. The controller is configured to control one or more operating parameters of the generator. The controller includes a memory (e.g., memory 116) storing computer-executable instructions that, when executed by a processor (e.g., processor 118), generate a compensation factor. The controller further adjusts at least one of the operating parameters of the generator based on the compensation factor. The computer-executable instructions include instructions for transforming (502) a numerical equation for calculating the compensation factor into a homogenous form and initializing (504) the transformed equation based on a set of initial values. The instructions further include instructions for iteratively solving (506) the transformed equation to determine a value of the compensation factor that minimizes a difference between a set point value of at least one of the operating parameters and a measured value of the at least one of the operating parameters of the generator.

In one form, the compensation factor includes one or more of a CO factor, an H2 factor, a process factor, a zone factor, a gas factor, a furnace factor, and a calibration factor. In another form, the adjusted operating parameter is carbon potential. In yet another form, the adjusted operating parameter is dew point. In another form, the computer-executable instructions include instructions for overwriting (320) a previous value of the compensation factor with the determined value of the compensation factor upon receiving, via the user human machine interface, an indication (314) that the determined value of the compensation factor is acceptable. In yet another form, the computer-executable instructions include instructions for discarding (318) the determined value of the compensation factor upon receiving, via the user human machine interface, an indication (314) that the determined value of the compensation factor is unacceptable.

A method in accordance with an aspect of the invention includes a method of calibrating a gas carburizing furnace (e.g., furnace 104). The method includes heating (302) a shim in the furnace and measuring (306) a value of a physical property within the furnace, such as carbon potential of the shim. The measured value (e.g., carbon potential) is provided (310) to a controller (e.g., controller 102). The controller is coupled to the furnace for controlling operating parameters of the furnace as a function of a set point (e.g., carbon potential set point). The controller (e.g., via compensation function 108) generates (312) a compensation factor as a function of the measured value (e.g., carbon potential). The method further includes adjusting (322) at least one of the operating parameters based on the compensation factor such that the measured value (e.g., carbon potential) and the carbon potential set point are equal.

In one form, the method further includes providing (304) an indication to the controller to store process data of the furnace after heating the shim. In another form, the method further includes verifying (308) the stored process data matches the shim and the measured carbon potential. In yet another form, the method further includes overwriting (320) a previous value of the compensation factor with the generated compensation factor upon receiving, via a user human machine interface (e.g., user HMI 106), an indication (314) that the generated compensation factor is acceptable. In another form, the method further includes discarding (318) the generated compensation factor upon receiving, via the user human machine interface, an indication (314) that the generated compensation factor is unacceptable. In yet another form, generating the compensation factor includes transforming (502) a numerical equation for calculating the compensation factor into a homogenous form, initializing (504) the transformed equation based on a set of initial values, and iteratively solving (506) the transformed equation to determine a value of the compensation factor that minimizes a difference between a set point value of at least one operating parameter and a measured value of the at least one operating parameter.

Another method in accordance with an aspect of the invention includes a method of calibrating an endothermic gas generator (e.g., generator 204). The method includes measuring (306) a value of a physical property of an atmosphere, such as dew point of gas, within the generator and providing (310) the measured value (e.g., dew point) to a controller (e.g., controller 102). The controller is coupled to the generator for controlling operating parameters of the generator as a function of a set point (e.g., dew point set point). The method further includes generating (312) a compensation factor as a function of the measured value (e.g., dew point) and adjusting (322) at least one of the operating parameters based on the compensation factor such that the measured value (e.g., dew point) and the dew point set point are equal.

In one form, the method further includes providing (304) an indication to the controller to store process data of the generator corresponding to a time period of the measuring. In another form, the method further includes verifying (308) the stored process data matches the measured dew point. In yet another form, the method further includes overwriting (320) a previous value of the compensation factor with the generated compensation factor upon receiving, via a user human machine interface (e.g., user HMI 106), an indication (314) that the generated compensation factor is acceptable. In another form, the method further includes discarding (318) the generated compensation factor upon receiving, via the user human machine interface, an indication (314) that the generated compensation factor is unacceptable. In yet another form, generating the compensation factor includes transforming (502) a numerical equation for calculating the compensation factor into a homogenous form, initializing (504) the transformed equation based on a set of initial values, and iteratively solving (506) the transformed equation to determine a value of the compensation factor that minimizes a difference between a set point value of at least one operating parameter and a measured value of the at least one operating parameter.

Accordingly, aspects of the invention relate to automatically generating a compensation factor for adjusting an operating parameter such that a measured carbon potential, dew point, or other controlled parameter matches the controller's set point value by inputting the measured parameter directly to the controller.

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of controlling a gas carburizing furnace, the method comprising:
    performing, by a controller coupled to the furnace, a calibration process of the gas carburizing furnace, wherein the controller is configured to control one or more operating parameters of the furnace as a function of a carbon potential set point, the calibration process comprising:
        heating a shim having a carbon content in the furnace;
        measuring a carbon potential of the shim after heating the shim, wherein the carbon potential of the shim is provided as a measured carbon potential;
        receiving, by the controller, the measured carbon potential;
        generating, by the controller, a compensation factor based on a numerical equation, wherein the numerical equation is associated with a probe configured to provide an oxygen level within the furnace and is a function of the compensation factor and the oxygen level provided by the probe, wherein the generating the compensation factor comprises:
            transforming the numerical equation into a homogeneous form provided as a transformed equation;
            determining the compensation factor by solving the transformed equation based at least on the measured carbon potential for which a solution of the numerical equation is zero;
        storing, by the controller, the compensation factor;
    performing, by the controller, a non-calibration process, wherein the non-calibration process comprises:
        determining, by the controller, a carbon potential based on the compensation factor stored and a measurement from the probe, and
        adjusting, by the controller, at least one of the one or more operating parameters based on the determined carbon potential and the carbon potential set point, and
        controlling the operation of the furnace based on the adjustment of the at least one or more operating parameters.

2. The method of claim 1, wherein the calibration process further comprises providing an indication to the controller to store process data of the furnace after said heating the shim.

3. The method of claim 2, wherein the calibration process further comprises verifying the stored process data matches the shim and the measured carbon potential thereof.

4. The method of claim 1, wherein the calibration process further comprises determining that the compensation factor is acceptable based on input via a user human machine interface, wherein the compensation factor is stored to overwrite a previously determined compensation factor in response to the compensation factor being accepted.

5. The method of claim 4, wherein the calibration process further comprises discarding the compensation factor in response to the compensation factor not being accepted.

6. The method of claim 1, wherein said generating the compensation factor further comprises:
    initializing the transformed equation based on a set of initial values; and
    after the transforming, iteratively solving the transformed equation until a current value of the compensation factor is determined that minimizes a difference between a set point value of at least one of the one or more operating parameters and a measured value of the at least one of the operating parameters.

7. The method of claim 6, wherein set point value is entered directly via a human machine interface corresponding thereto.

8. The method of claim 1, wherein the compensation factor is one or more of the following: CO factor, H2 factor, process factor, zone factor, gas factor, furnace factor, and calibration factor.

9. A method of controlling a gas carburizing furnace by a controller configured to control a parameter that impacts operation of the gas carburizing furnace as a function of a carbon potential set point, the method comprising:
    performing a calibration process of the gas carburizing furnace, the calibration process comprising:
        heating a shim having a carbon content in the furnace;
        measuring a carbon potential of the shim after heating the shim, wherein the carbon potential of the shim is provided as a measured carbon potential;
        receiving the measured carbon potential;
        generating a compensation factor based on a numerical, wherein the numerical equation is associated with a probe configured to provide an oxygen level within the furnace and is a function of the compensation factor and the oxygen level provided by the probe, wherein the generation of the compensation factor comprises:
            transforming the numerical equation into a homogeneous form provided as a transformed equation;
            determining the compensation factor by solving the transformed equation based at least on the measured carbon potential for which a solution of the numerical equation is zero;
        storing the compensation factor;
    performing a non-calibration process, wherein the non-calibration process comprises:
        determining a carbon potential based on the compensation factor stored and a measurement from the probe, and
        impacting the operation of the gas carburizing furnace with an adjustment to the parameter, wherein the adjustment to the parameter is based on the determined carbon potential and the carbon potential set point.

10. The method of claim 9, wherein the calibration process further comprises providing an indication to the controller to store process data of the furnace after said heating the shim.

11. The method of claim 10, wherein the parameter that impacts operation of the gas carburizing furnace is a temperature associated with the furnace.

12. The method of claim 9, wherein the parameter that impacts operation of the gas carburizing furnace is a time associated with the furnace.

\* \* \* \* \*